US004001692B2

United States Statutory Invention Registration [19]

[11] Reg. Number: H1692

[45] Published: Nov. 4, 1997

Lohrman

[54] MILLIMETER WAVE, HIGH POWER, BROADBAND TRAVELLING WAVE TUBE

[75] Inventor: Dieter R. Lohrman, Waldorf, Md.

[73] Assignee: United States of America, Washington, D.C.

[21] Appl. No.: 350,980

[22] Filed: Nov. 29, 1994

[51] Int. Cl.[6] ..... H01J 25/34

[52] U.S. Cl. ..... 315/3.5; 315/39.3

*Primary Examiner*—Bernarr E. Gregory

*Attorney, Agent, or Firm*—Thomas E. McDonnell; Charles J. Stockstill

[57] ABSTRACT

A travelling wave tube which amplifies a signal and includes an electron gun, a D.C. voltage generator, an electron accelerator and delay structure loaded with dielectric material. The electron gun is at approximately ground potential and emits an electron beam. The D.C. voltage generator generates a very high D.C. voltage. The electron accelerator receives the high D.C. voltage from the D.C. voltage generator and accelerates the electrons in the electron beam. The delay structure is at approximately the same high D.C. voltage as the electron accelerator and includes an input port and an output port, the signal being received in the input port, travelling through the delay structure, and being output at the output port. The rf input and output windows are insulated from the high DC potential of the delay structure by dielectric wave guides. The accelerated electrons in the electron beam interact with the signal travelling through the waveguide to transfer energy from the electron beam to the signal and cause the signal received by the input port of the waveguide to be amplified at the output port of the waveguide.

20 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MILLIMETER WAVE, HIGH POWER, BROADBAND TRAVELLING WAVE TUBE

BACKGROUND OF THE INVENTION

1. Field of the Invention

The present invention relates to a travelling wave tube and, more particularly, to a millimeter wave, high power, broadband travelling wave tube.

2. Description of the Related Art

A travelling wave tube is a device capable of amplifying electromagnetic waves to high power levels over broad bandwidths and is used in such areas as communications, radar, guidance and electronic countermeasure systems. The travelling wave tube receives an electromagnetic wave and causes the electromagnetic wave to interact with an electron beam emitted from an electron gun. A portion of the energy from the electron beam is transferred to the electromagnetic wave to increase the power of the electromagnetic wave.

A conventional travelling wave tube structure is shown in FIG. 1. As illustrated in FIG. 1, a radio frequency, rf, interaction circuit 20 receives an electromagnetic wave at an input port 22. The electromagnetic wave travels through rf interaction circuit 20 to an output port 24 and, in the process, an electric field radiates from rf interaction circuit 20. An electron gun 26 emits an electron beam 28 which passes in close proximity to rf interaction circuit 20, so that electron beam 28 interacts with the electric field. Through this interaction, energy from electron beam 28 is transferred to the electromagnetic wave. Thus, the travelling wave tube acts to amplify an electromagnetic wave received at input port 22 of rf interaction circuit 20 and produce an amplified electromagnetic wave at output port 24. Electron beam 28 is focused by a magnetic focusing system 30. A collector 32 receives electron beam 28 and dissipates the power remaining in electron beam 28.

A fundamental principle of the operation of a travelling wave tube is that an electromagnetic wave travels through, and radiates from, an rf interaction circuit so that an electron beam can be passed in close proximity to the rf interaction circuit to interact with the radiated portion of the electromagnetic wave. This interaction generally requires that the electron beam move at approximately the same, or at a slightly higher, velocity as the electromagnetic wave. Since an unhindered electromagnetic wave moves at a much faster velocity than the electrons in an electron beam, an rf interaction circuit utilizes some type of a delay structure to slow down the velocity of the electromagnetic wave in the direction of travel of the electron beam. A helix is typically used as a delay structure. Rf interaction circuit 20 in FIG. 1 is a helix. Generally, a helix, as illustrated in FIG. 1, is a spiral shaped device which allows an electron beam to pass through the center of the spiral without actually striking the helix. The electromagnetic wave radiates from the helix and the electron beam interacts with the electromagnetic wave by passing through the center of the helix over a length of several inches. However, at millimeter waves of 95 GHz and above, a conventional helix becomes prohibitively small. For example, a conventional helix would have an inner diameter of approximately 0.014 inches at 95 GHz. The small diameter of the helix makes it difficult to align the electron beam and makes fabrication of the travelling wave tube exceedingly difficult and expensive. In addition, it is difficult to conduct heat out of such a tiny helix.

Alternatively, a simple metal waveguide can be used as a delay structure, with an electron beam passing through it to interact with the electromagnetic wave travelling in it. For millimeter waves, the inner diameter of the waveguide would be relatively large. This makes it relatively easy to produce a high power electron beam and to align the electron beam so that it passes close to the waveguide. However, the phase velocity in the waveguide is greater than the speed of light and thus, the plain waveguide is not suitable for fundamental type interaction.

Many other types of delay structures have been used in travelling wave tubes. These delay structures include the Extended Interaction design, the tapered waveguide design, the folded waveguide design and others. These delay structures have enjoyed only limited success in travelling wave tubes and are generally not satisfactory for millimeter wave, high power, broadband operation.

Therefore, according to this invention, delay structures using dielectric materials or a combination of metal and dielectric material are used. These structures have a phase velocity below the speed of light, but they also have dispersion, which limits the bandwidth. This dispersion is less the higher the phase velocity, meaning that for a wide bandwidth, very high beam voltages, e.g., in excess of 50 kV, are required.

SUMMARY OF THE INVENTION

Accordingly, it is an object of the present invention to provide a travelling wave tube which is operable with millimeter waves over a broadband frequency range and produces high power amplification, using dielectric delay structures.

It is a further object of the present invention to provide a travelling wave tube which produces a high D.C. voltage to increase the speed of electrons in an electron beam so that the electron beam interacts with an electromagnetic wave travelling in a waveguide, where components at a high D.C. voltage are encased by a vacuum vessel to protect personnel from exposure to the high D.C. voltage.

It is also an objective of this invention to overcome problems with safety, x-ray radiation, excessive size and weight, high cost and low reliability concomitant of very high voltage designs.

Additional objects and advantages of the invention will be set forth in part in the description which follows and, in part, will be obvious from the description, or may learned by practice of the invention.

The foregoing objects of the present invention are achieved by providing a travelling wave tube which amplifies a signal. The travelling wave tube comprises an electron gun which is at approximately ground potential and emits an electron beam, and a delay structure that comprises an input port and an output port, the signal being received in the input port, travelling through the delay structure, and being output at the output port. The electron beam passes by the delay structure to interact the electrons of the electron beam with the signal as the signal travels through the delay structure. The interaction of the electrons of the electron beam with the signal causes a transfer of energy from the electron beam to the signal and causes the signal received by the input port of the delay structure to be amplified at the output port of the delay structure.

The foregoing objects are also achieved by providing a travelling wave tube which comprises an electron gun that is at ground potential and emits an electron beam. A D.C. voltage generator generates a positive D.C. voltage in reference to ground potential. An electron accelerator receives the D.C. voltage from the D.C. voltage generator and accelerates the electrons in the electron beam. The delay structure is at approximately the same D.C. voltage as the electron accelerator and comprises an input port and an output port, a signal being received in the input port, travelling through the delay structure, and being output at the output port. The electron beam passes through the delay structure to interact with the signal travelling through the delay structure. The interaction of the accelerated electrons in the electron beam with the signal causes a transfer of energy from the electron beam to the signal and causes the signal received by the input port of the delay structure to be amplified at the output port of the waveguide.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
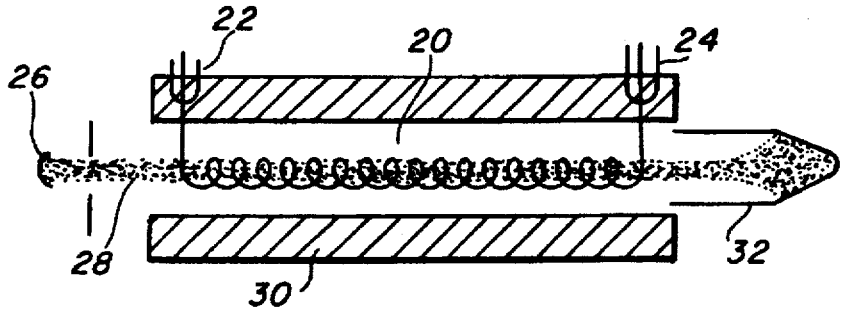
PRIOR ART FIG. 1
FIG. 1 (prior art) is a diagram of a conventional configuration of a travelling wave tube.
Figure 2:
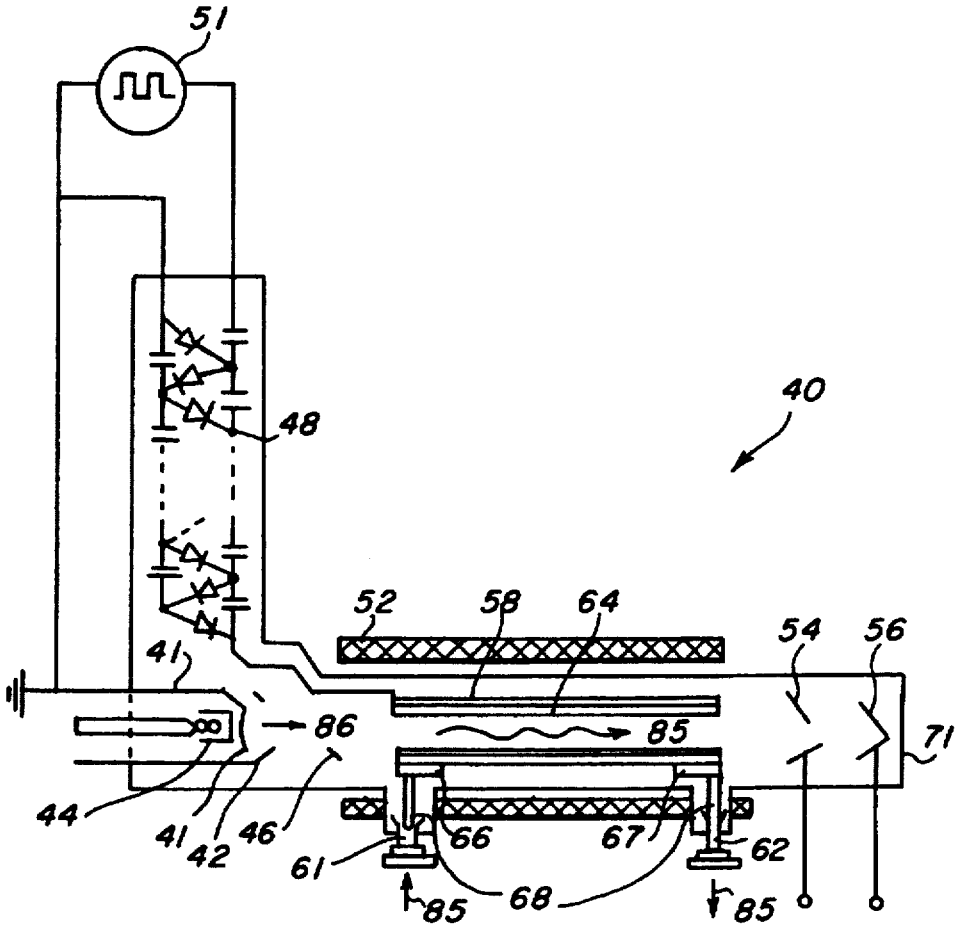
FIG. 2 is a diagram of a travelling wave tube according to an embodiment of the present invention.

In the preferred embodiment of the present invention, as shown in FIG. 2, a travelling wave 40 tube is comprised of a cathode 41, grid 42 and heater 44 form a conventional electron gun. Heater 44 heats cathode 41 and the cathode 41 emits an electron beam 86. Grid 42 permits cathode 41 to be keyed ON and OFF. ON and OFF keying of electron beam 86 by grid 42 is well-known to those practicing in the art. Cathode 41, grid 42 and heater 44 are all preferably at a potential which is close to, or at, ground potential. A conventional high voltage accelerator electrode 46 accelerates electrons in the electron beam 86 emitted by cathode 41 to quasi-relativistic speed. Such speeds approach and may exceed, for example, 0.5 to 0.6 c. A high direct current (D.C.) voltage in excess of 50 kV, e.g., 150 kV, is generated by a conventional D.C. multiplier stack 48 and supplied to accelerator electrodle 46 to accelerate the electron beam 86. A conventional signal generator 51 provides a driver signal for D.C. multiplier stack 48. This driver signal typically is a rectangular waveform of 6–10 kV peak-to-peak voltage and 100 kHz to 1 MHz frequency. The D.C. multiplier stack 48 is placed in a high vacuum vessel 71. A conventional magnetic assembly 52 provides focusing of the electron beam 86. The electron beam 86 is decelerated by a conventional deceleration electrode 54 and the electron beam 86 is received by a conventional collector 56 to dissipate the remaining electron beam 86 power. If deceleration electrode 54 is not provided, an electron beam 86 of, for example, 150 kV energy striking collector 56 would create extensive X-ray radiation. Therefore, deceleration electrode 54 is used to decelerate the electron beam 86 before it strikes collector 56.

A waveguide delay structure 58 receives an electromagnetic wave 85 through an input waveguide window 61 and an electric field is radiated from delay structure 58 as a result of the electromagnetic wave 85 travelling through it. Delay structure 58 provides the interaction between the electron beam 86 and the electromagnetic wave 85 to produce an amplified electromagnetic wave 85 at an output waveguide window 62. Thus, input waveguide window 61 and output waveguide window 62 act as input and output ports, respectively, of delay structure 58. Preferably, the electron beam 86 travels close to waveguide delay structure 58 and in a direction which is parallel to the direction of the propogation of the electromagnetic wave 85.

Waveguide delay structure 58 preferably may be of either a round or rectangular cross-section, preferably round, and is preferably clad by a dielectric material 64 on the inside to reduce the phase velocity of the electromagnetic wave 85. For a waveguide delay structure 58 with a round cross-section, the $TM_{01}$ propagation mode is typically used. Delay structure 58 preferably is connected to accelerator electrode 46 so that the dely structure 58 is at approximately the same D.C. potential as accelerator electrode 46. If delay structure 58 were at ground potential, a strong electric field would form between the accelerating electrode 46 and the delay structure 58, decelerating the electron beam 86. To avoid this, the delay structure 58 must be at a potential close to that of the accelerating electrode 46, e.g., at 150 kV. According to the invention, the r.f. waveguide input window 61 and output window 62 are insulated from this high D.C. voltage by dielectric waveguides 68. Thus, input waveguide window 61 and output waveguide window 62 are on ground potential with respect to D.C. in the interest of safety.

Conventional directional couplers 66 and 67, respectively, couple the electromagnetic wave 85, into, and out of, delay structure 58. Conventional dielectric waveguides 68 connect directional couplers 66 to input waveguide window 61 and output waveguide window 62.

As previously disclosed, the velocity of the electrons in the electron beam 86 must be approximately the same as the velocity of the electromagnetic wave 85. However, the velocity of the electromagnetic wave 85 is much faster than the velocity of the electrons. Therefore, dielectric material 64 in waveguide delay structure 58 acts to slow the velocity of the electromagnetic wave 85, while the high D.C. potential generated by D.C. multiplier stack 48 acts to increase the speed of the electrons, thereby approximately matching the velocity of the electrons with the velocity of the electromagnetic wave 85.

According to the present invention, a travelling wave tube 40 is provided which produces a high D.C. potential to increase the velocity of electrons in an electron beam 86 so that the electron beam 86 interacts with an electromagnetic wave 85 travelling in a delay structure 58. Delay structure 58 is at the high D.C. potential. Input waveguide window 61 and output waveguide window 62 are at approximately ground potential. Dielectric waveguides 68 insulate input waveguide window 61 and output waveguide window 62 from the high D.C. potential of delay structure 58 and only the rf voltage is transferred to input waveguide window 61 and output waveguide window 62.

The high D.C. voltage produced by D.C. multiplier stack 48 is preferably above 50 kV, typically 150 kV D.C. D.C.

multiplier stack 48 is enclosed in a conventional vacuum vessel 71 to reduce or eliminate problems with safety, insulation, reliability, and altitude at which the travelling wave tube 40 can be used. However, it also can be encased in a separate high vacuum vessel (not shown), which is then connected to the vacuum vessel 71 by high vacuum proof hermetic seal (not shown), such as a glass feed through. D.C. multiplier stack 48 comprises capacitors and semiconductor rectifiers. Therefore, D.C. multiplier stack 48 preferably uses only materials such as metals, ceramics and silicon. These materials are compatible with use in a high vacuum. D.C. multiplier stack 48 can even be "baked" during evacuation to release gases absorbed at the surface. (It is to be noted, if diamond based diodes are used, baking temperatures far above 300° C. can be used.) As a result, no basic problems should arise in maintaining D.C. multiplier stack 48 inside vacuum vessel 71 or in maintaining a high vacuum. The length of D.C. multiplier stack 48 will typically be only approximately two or three inches since the breakthrough voltage in high vacuum is in the order of 100 kV/mm.

The output of D.C. multiplier stack 48, accelerator electrode 46 and delay structure 58 are all preferably at the same high D.C. potential and are encased by vacuum vessel 71. Cathode 41, grid 42 and heater 44 are at approximately ground potential. Preferably, only components at low D.C. potential are outside of vacuum vessel 71.

Typical voltages used in the present invention can be contrasted to typical voltages used in conventional travelling wave tubes. The present invention uses a high D.C. potential of typically 150 kV. By contrast, a conventional travelling wave tube uses a high D.C. potential of approximately 10 kV or less. Thus, the term "high D.C. potential" in the present invention refers to approximately 50 kV, and above, while the term "high D.C. potential" in a conventional travelling wave tube refers to approximately 10 kV. In the present invention, cathode 41, grid 42 and heater 44 are at approximately ground potential. This greatly reduces cost, size and weight and increases reliability, because the heater source, the cathode source and the grid drive circuits are all on low potential, rather than on 150 kV. By contrast, in a conventional travelling wave tube, the cathode, grid and heater are at a high D.C. potential. In the present invention, the delay structure 58 is at a high D.C. potential. By contrast, in a conventional travelling wave tube, the delay structure is at approximately ground potential.

Moreover, the travelling wave tube of the present invention uses dielectric waveguides 68 to couple input waveguide window 61 and output waveguide window 62 to delay structure 58. Therefore, delay structure 58 can be at a high D.C. potential without risking injury to personnel. By contrast, conventional travelling wave tubes use metal waveguides as input and output ports of the delay structure. Therefore, in a conventional travelling wave tube, the delay structure must be at ground potential with respect to D.C. so that a high D.C. potential is not transferred via the metal waveguides to people who accidentally come into contact with the waveguide. The present invention also generates a much higher electron speed or velocity in the electron beam 86 as compared to conventional travelling wave tubes.

Moreover, according to the present invention, as a result of cathode 41, grid 42 and heater 44 being close to ground potential, the design of ancillary circuitry is simplified, costs are reduced and reliability is increased. Physical construction of the embodiments of the present invention is possible for millimeter wavelengths due to the small size of dielectric waveguides 68 at these wavelengths. The dielectric may be coated with a material of high electric resistivity in order to dissipate electric charges deposited by stray electrons of the electron beam 86. Alternately, dielectric material of high electric resistivity may be used to dissipate those charges. A material having high electric resistivity is a material having a resistivity high enough that the traveling wave tube is not attenuated by it but still having a high enough resistivity that it can dissipate the electric charges.

Figure 3:
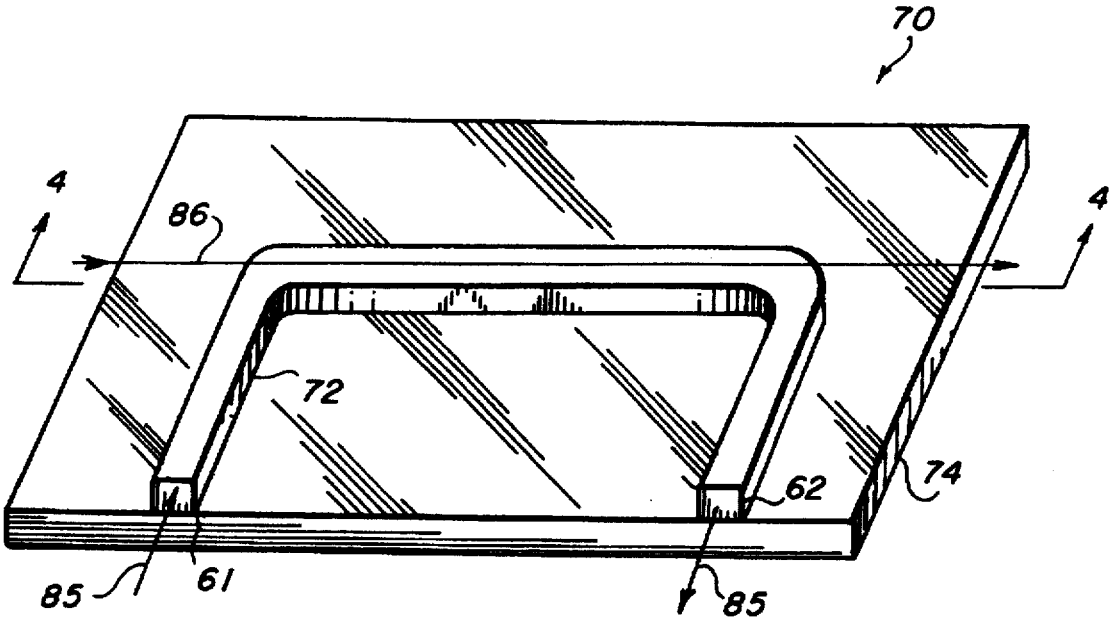
FIG. 3 is a diagram of a delay structure according to an embodiment of the present invention.

As a result of the high D.C. potential generated in the travelling wave tube 40 of the present invention, the travelling wave tube 40 preferably utilizes a conventional dielectric loaded waveguide as a delay structure 58, such as waveguide delay structure 58 loaded with dielectric material 64. However, the travelling wave tube 40 of the present invention can use a conventional dielectric waveguide 68. FIG. 3 illustrates a travelling wave tube 70 utilizing a dielectric waveguide 72 according to an embodiment of the present invention. An electromagnetic wave 85 travels along a conventional dielectric waveguide 72 which is attached to a conducting plate 74. Conducting plate 74 provides for mechanical stability, heat transfer and dissipation of static charges that may collect on dielectric waveguide 72. Dielectric wave guide 72 may be coated with a thin film of material having a high electric resistivity in order to dissipate any electrical surface charges caused by stray electrons from the beam to the conducting plate 74. The same can be achieved by using a dielectric material which has high electric resistivity. Electromagnetic wave 85 enters an input port 61 of dielectric waveguide 72 and exits an output port 62 of dielectric waveguide 72. An electron beam 86 passes very closely above dielectric waveguide 72.

Figure 4:
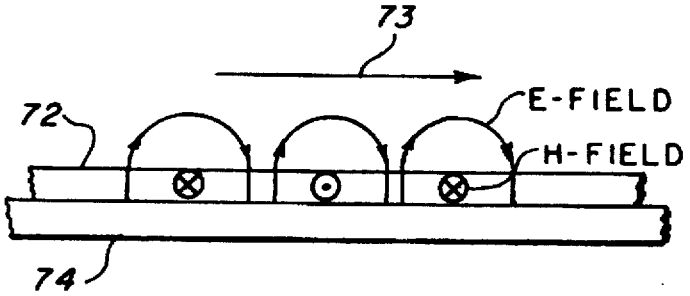
FIG. 4 is a cross section view along line 4—4 in FIG. 3, and illustrates the interaction of an electron beam and an electromagnetic wave in a travelling wave tube utilizing a dielectric waveguide according to an embodiment of the present invention.

A cross section view along line 4—4 in FIG. 3 is depicted in FIG. 4 and depicts the interaction of electron beam 86 and electromagnetic wave 85 in dielectric waveguide 72 according to an embodiment of the present invention. Arrow 73 represents the direction of propagation of electromagnetic wave 85 and electron beam 86. As shown in FIG. 4, electromagnetic wave 85 has an electric field (E-field) component and a magnetic field (H-field) component. The E-field component extends outside dielectric waveguide 72 and interacts with electron beam 86 to produce the travelling wave tube effect of transferring energy from electron beam 86 to electromagnetic wave 85.

Figure 5:
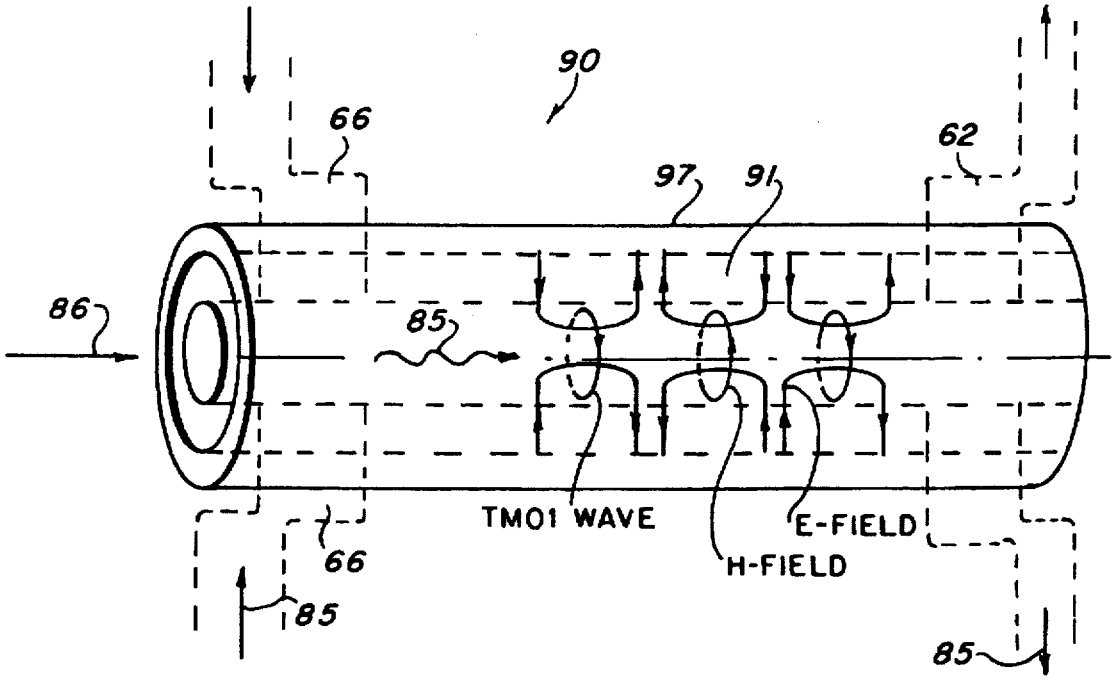
FIG. 5 is an alternate delay structure using a cylindrical metal wave guide which is clad on the inside with dielectric material according to the embodiment of the present invention.

A cylindrical metal waveguide delay structure 90, as shown in FIG. 5, has a metal guide 97 clad inside with a dielectric layer 91. Input directional coupler 66 excites the $TM_{01}$ wave or one of higher order in the delay structure 90 in ways known to those in the art. The wave then propagates to the output directional coupler 67, where it is output. Electron beam 86 passes through the center of the delay structure 90, causing the amplification effect.

Figure 6:
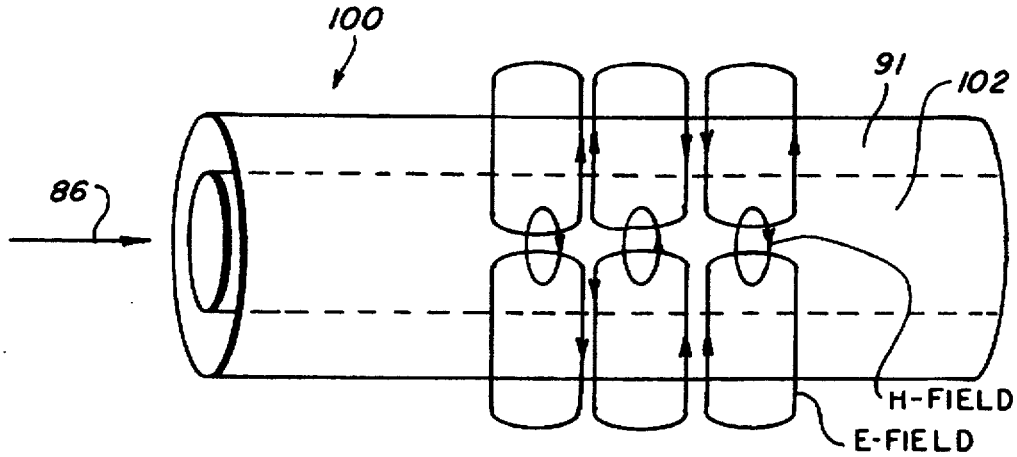
FIG. 6 is an alternate delay structure using a cylindrical dielectric wave guide according to the embodiment of the present invention.

A cylindrical waveguide structure 100, shown in FIG. 6, is similar to FIG. 5, but without the metal guide 97. In that case, part of the electromagnetic field will be traveling outside the waveguide 100, where it decays exponentially in the radial direction. This must be taken into account in designing the surrounding mechanical structures. The electron beam 86 passes along the center of the pipe 102, causing the amplification effect. Directional couplers (not shown) are used to couple the rf energy into and out of the delay structure (not shown), as described above.

According to the present invention, by using a type of waveguide as the delay structure, the travelling wave tube of the present invention is easily fabricated and alignment of the electron beam with respect to the delay structure is easily obtained. Preferably, all components that are at high D.C. potential are enclosed in a vacuum vessel.

The present invention is described above as having specific voltages at various points. For example, D.C. multiplier stack 48 is described as generating 150 kV. However, the present invention is not limited to the specific voltage levels described herein and a person skilled in the art would easily recognize that various voltages can be utilized. For example, a D.C. multiplier stack can be used which generates more or less than the 150 kV described herein.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A travelling wave tube which receives an electromagnetic wave, comprising:

an electron gun capable of emitting an electron beam and operating at approximately ground potential and;

a delay structure comprising an input port and an output port;

the electromagnetic wave being applied to the input port, travelling through the delay structure, and being output at the output port; and the electron beam applied to the delay structure, passing by the delay structure to interact the electrons of the electron beam with the electromagnetic wave as the electromagnetic wave travels through the delay structure.

2. A travelling wave tube as in claim 1, wherein the electron gun comprises a cathode, a heater and a grid which are at approximately ground potential.

3. A travelling wave tube as in claim 1, further comprising:

a generator capable of generating a direct current voltage; and an electron accelerator to which the direct current voltage is applied that accelerates the electrons in the electron beam before the electrons interact with the electromagnetic wave.

4. A travelling wave tube as in claim 3, wherein the delay structure is a dielectric which receives the input electromagnetic wave input and the travelling wave tube further comprises:

an input port window;

a first dielectric waveguide which couples the delay structure to the input port window of the tube and insulates the input port with respect to direct current potential from the delay structure; and a second dielectric waveguide which couples the first dielectric waveguide to the output port and insulates the output port with respect to direct current potential from the delay structure.

5. A travelling wave tube as in claim 4, further comprising a first directional coupler which couples the electromagnetic wave from the first dielectric waveguide into the delay structure and a second directional coupler which couples the electromagnetic wave from the delay structure into the second dielectric waveguide.

6. A travelling wave tube as in claim 4, wherein the direct current voltage generator generates a direct current voltage in the approximate range of 150 kV.

7. A travelling wave tube as in claim 4, further comprising a vacuum vessel which encloses the direct current voltage generator.

8. A travelling wave tube as in claim 7, wherein the delay structure is enclosed in a vacuum vessel.

9. A travelling wave tube as in claim 3, further comprising:

a deceleration electrode which decelerates the electrons in the electron beam after the electrons interacts with the electromagnetic wave; and a collector which dissipates the energy remaining in the electron beam after the electrons in the electron beam are decelerated by the deceleration electrode.

10. A travelling wave tube which receives a signal, comprising:

an electron gun capable of emitting an electron beam comprised of electrons at a reference potential;

a generator which generates a direct current voltage, the direct current voltage being greater than the reference potential;

an electron accelerator which receives the direct current voltage from the generator and accelerates the electrons in the electron beam; and a delay structure at approximately the same direct current voltage as the electron accelerator and having an input port and an output port;

an electromagnetic wave, applied to the input port, travelling through said delay structure, and being output at the output port;

the electron beam being applied to the delay structure, passing by or through the delay structure to interact the accelerated electrons in the electron beam with the electromagnetic wave travelling through said delay structure.

11. A travelling wave tube as in claim 10, wherein the delay structure is coupled to the electron accelerator to maintain the delay structure at approximately the same direct current potential as the electron accelerator.

12. A travelling wave tube as in claim 10, wherein the delay structure receives the same direct current voltage from the direct current voltage generator as the electron accelerator receives from the direct current voltage generator.

13. A travelling wave tube as in claim 10, wherein the delay structure is a dielectric waveguide or a dielectric loaded waveguide.

14. A travelling wave tube as in claim 13, a dielectric material for the dielectric waveguide or dielectric loaded waveguide forming the delay structure is a material having a high but finite electric resistivity to dissipate electric surface charges caused by stray electrons.

15. A travelling wave tube as in claim 10, further comprising:

a first dielectric waveguide which couples the delay structure to the input port and insulates the input port with respect to the direct current potential from the delay structure; and a second dielectric waveguide which couples the delay structure to the output port and insulates the output port with respect to direct current potential from the waveguide.

16. A travelling wave tube as in claim 10, wherein the D.C. voltage generator generates a direct current voltage above 50 kV, typically 150 kV.

17. A travelling wave tube as in claim 10, further comprising a vacuum vessel which encloses the direct current voltage generator, electron accelerator and the waveguide.

18. A travelling wave tube as in claim 10, further comprising:

a deceleration electrode which decelerates the electrons in the electron beam after the electrons interacts with the electromagnetic wave; and a collector which dissipates the energy remaining in the electron beam after the electrons in the electron beam are decelerated by the deceleration electrode.

19. A travelling wave tube which receives an electromagnetic wave, comprising:

an electron gun capable of emitting an electrion beam comprised of electrons at approximately ground potential;

a generator capable of generating a direct current voltage that is greater than ground potential;

a waveguide further comprised of;

an electron accelerator which receives the direct current voltage from the direct current voltage generator and accelerates the electrons in the electron beam;

a delay structure which is coupled to the electron accelerator to maintain the waveguide at approximately the same direct current voltage as the electron accelerator;

an input port for receiving the electromagnetic wave;

an output port for outputting the electromagnetic wave;

a first dielectric waveguide which couples the delay structure to the input port and insulates the input port with respect to direct current potential from the waveguide;

a second dielectric waveguide which couples the delay structure to the output port and insulates the output port with respect to direct current potential from the waveguide, the signal being received in the input port, travelling through the delay structure, and being output at the output port, the electron beam passing by or through said delay structure to interact the accelerated electrons in the electron beam with the electromagnetic wave travelling through the waveguide;

a deceleration electrode which decelerates the electrons in the electron beam after the electrons interact with the electromagnetic wave; and a collector which dissipates the energy remaining in the electron beam after the electrons in the electron beam are decelerated by the deceleration electrode.

20. A traveling wave tube as in claim 19, further comprising a coating of material of high electric resistivity on the surface of the dielectric waveguide to dissipate electric surface charges caused by stray electrons.

* * * * *